No. 680,838.  
H. BOURGEOIS.  
INCUBATOR FOR FISH.  
(Application filed May 10, 1901.)  
Patented Aug. 20, 1901.

(No Model.)

Witnesses:—
Benjamin Clark
Charles H. Briggs

Inventor:—
Henry Bourgeois.
per:— E. Eaton
His Attorney.

THE NORRIS PETERS CO., PHOTO-LITHO., WASHINGTON, D. C.

United States Patent Office.

HENRY BOURGEOIS, OF TOUROUVRE, FRANCE.

INCUBATOR FOR FISH.

SPECIFICATION forming part of Letters Patent No. 680,838, dated August 20, 1901.

Application filed May 10, 1901. Serial No. 59,702. (No model.)

*To all whom it may concern:*

Be it known that I, HENRY BOURGEOIS, a citizen of the Republic of France, and a resident of Tourouvre, in the department of Orne, France, have invented certain new and useful Improvements in Incubators for Fish, (for which I have applied for a patent in France, No. 296,073, dated January 30, 1901,) of which the following is a full, clear, and exact specification.

My invention relates to an improved incubator for fish-eggs; and it consists of a tank or casing provided with a movable grid formed of glass rods upon which the eggs are placed, said glass rods being the required distance apart, such that the fry when hatched will fall to the bottom of the tank. The tank or casing is also provided with a movable vertical plate, half of the area of said plate being suitably perforated and is placed in the tank or casing aforesaid in such a position that when eggs are placed upon the movable grid aforesaid the current or stream of water flowing through the tank or casing will be caused to flow among the eggs; but upon the fry being hatched the position of the perforated plate aforesaid is reversed, so that the current or stream of water will flow along the bottom of the tank or casing, so supplying the fry with a constant change of water.

For purposes of illustration I will now refer to the annexed drawings, in which—

Figure 1:
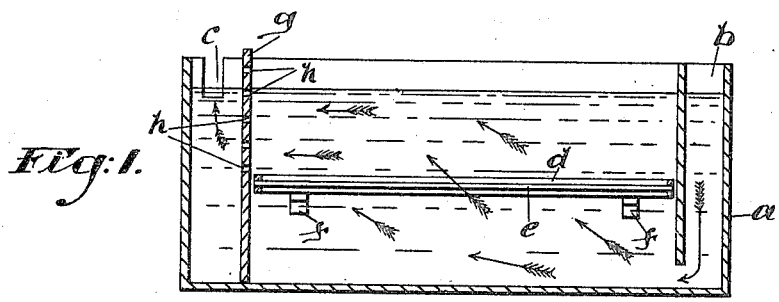
Figure 2:
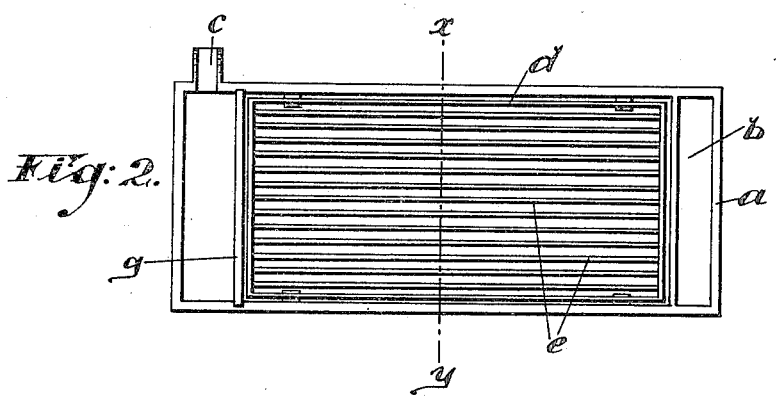
Figure 3:
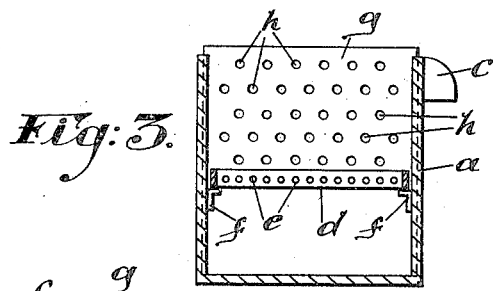
Figure 4:
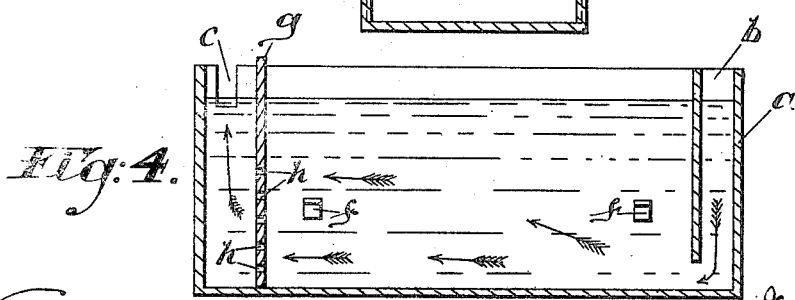

Figure 1 is a longitudinal section of my improved incubator; Fig. 2, a plan view of same; Fig. 3, a cross-section through line X Y, Fig. 2. Fig. 4 is a longitudinal section showing the grid removed and the position of the movable vertical plate when the fry have been hatched.

The tank or casing $a$ is provided with a water-inlet $b$ and an outlet or overflow $c$.

The movable grid consists of a number of glass rods $e$, being attached to a frame $d$ in any suitable manner, the grid being supported upon the projections $f$ or the like.

The movable vertical plate $g$ is carried in grooves or the like in the sides of the tank or casing $a$, about one-half of its area being provided with suitable perforations $h$, as shown in Fig. 3.

Referring to Figs. 1, 2, and 3, the eggs are placed upon the grid, the plate $g$ is placed in position, as shown, so that the perforated part is uppermost, and a constant supply of water is allowed to enter the tank or casing at the inlet $b$. Now it will be seen that the stream or current of water will be caused to flow in a direction as shown by the arrows in Fig. 1, passing between the glass rods $e$, so circulating the eggs with a constant change of water. Referring to Fig. 4, upon the fry being hatched they will fall to the bottom of the tank. The grid is then removed and the position of the plate $g$ reversed, as shown, so causing the stream or current of water to flow in a direction as shown by the arrows, thus giving the fry a constant change of fresh water.

Having thus described my invention, what I claim, and desire to secure by Letters Patent, is—

A fish-incubator consisting of a tank containing a movable grid, a movable vertical plate half the area of which is perforated and arranged so as to cause a flow of water, first through the grid, and then by reversing the movable vertical plate aforesaid, in a horizontal direction, substantially as described and illustrated herein and for the purpose set forth.

In testimony that I claim the foregoing I have hereunto set my hand this 6th day of March, 1901.

HENRY BOURGEOIS.

Witnesses:
 BENJAMIN CLARK,
 A. E. GEORGE.